United States Patent
Zeitlin et al.

(10) Patent No.: US 7,523,654 B2
(45) Date of Patent: Apr. 28, 2009

(54) METHOD AND APPARATUS FOR EVALUATING NVH CHARACTERISTICS OF MECHANICAL SYSTEMS

(75) Inventors: Alexander Semion Zeitlin, Rochester Hills, MI (US); Todd Allen Smith, Perrysburg, OH (US); Zouhair Lazreq, Toledo, OH (US)

(73) Assignee: Dana Automotive Systems Group, LLC, Toledo, OH (US)

( * ) Notice: Subject to any disclaimer, the term of this patent is extended or adjusted under 35 U.S.C. 154(b) by 16 days.

(21) Appl. No.: 11/742,701

(22) Filed: May 1, 2007

(65) Prior Publication Data

US 2008/0271538 A1 Nov. 6, 2008

(51) Int. Cl.
*G01M 17/00* (2006.01)

(52) U.S. Cl. .................................. 73/115.07
(58) Field of Classification Search .............. 73/115.01, 73/115.05, 115.06, 115.07
See application file for complete search history.

(56) References Cited

U.S. PATENT DOCUMENTS

| | | | |
|---|---|---|---|
| 6,029,985 A | 2/2000 | Lundy | |
| 6,131,454 A | 10/2000 | Kopp et al. | |
| 6,389,888 B1 | 5/2002 | Juranitch et al. | |
| 6,729,186 B1 | 5/2004 | Sirrine et al. | |
| 6,802,206 B2 | 10/2004 | Kurecka et al. | |
| 6,865,466 B2 | 3/2005 | Voight et al. | |
| 6,877,368 B2 | 4/2005 | Juranitch et al. | |
| 6,907,774 B2 | 6/2005 | Kurecka et al. | |
| 2003/0019285 A1* | 1/2003 | Juranitch et al. | 73/118.1 |
| 2003/0154775 A1* | 8/2003 | Passino et al. | 73/183.1 |
| 2004/0069053 A1* | 4/2004 | Kurecka et al. | 73/114 |

FOREIGN PATENT DOCUMENTS

| | | |
|---|---|---|
| DE | 102 03 979 A1 | 8/2003 |
| JP | 8-210442 | 8/1996 |
| JP | 10-264667 | 10/1998 |

* cited by examiner

*Primary Examiner*—Eric S McCall
(74) *Attorney, Agent, or Firm*—Berenato, White & Stavish

(57) ABSTRACT

A method and apparatus for evaluating NVH characteristics of a mechanical system including a torque-transmitting assembly having drive and driven members drivingly engaging each other. The torque-transmitting assembly is characterized by transmission error between the drive and driven members. The method comprises the steps of measuring a parameter representing NVH characteristics of the mechanical system during operation thereof upon a predetermined test cycle so as to obtain at least one NVH characteristic corresponding to at least two discrete values of the transmission error. The apparatus comprises a supporting member mounted to a casing for rotatably supporting the drive member and being axially movable relative to the casing so as to selectively adjust the transmission error, and an actuator assembly operatively associated with the supporting member for selectively adjusting position of the supporting member relative to the casing in order to selectively control the transmission error.

33 Claims, 3 Drawing Sheets

METHOD AND APPARATUS FOR EVALUATING NVH CHARACTERISTICS OF MECHANICAL SYSTEMS

BACKGROUND OF THE INVENTION

1. Field of the Invention

The present invention relates to methods and apparatuses for evaluating NVH characteristics in general, and more particularly to method and apparatus for experimentally evaluating at least one of NVH characteristics of a mechanical system including a torque-transmitting assembly having a drive member and a driven member drivingly engaging said drive member.

2. Description of the Prior Art

Implementation of modern technologies for analysis of noise, vibration and harshness (NVH) problems in the automotive field can encounter certain problems, one of which is the lack of objective criteria of noise and/or vibration acceptance in terms of its technological background. In other words, there is no clear correlation between some of critical technical parameters of automotive systems and overall noise level associated with them. Conceptual understanding of their functional connection does not achieve objective of a quantified association through a reliable and repeatable measurement methodology. Evaluation of NVH parameters of automotive axles in association with motion transmission errors (MTE or TE) in hypoid gear sets (final drives) of the axles could be considered as an example of such methodology. Similar methods could be used in application to any other driveline components of a motor vehicle.

It is known in the art that there is a correlation between TE of automotive axle and level of noise associated therewith in a passenger compartment of a motor vehicle. However, currently there exists no quantitative evaluation of such an association. As a result, automotive engineers and manufacturers of the automotive driveline components are forced to produce driveline components, such as drive axles, with maximum accuracy to insure that noise generated by the driveline components does not exceed established level. Consequently, the driveline component manufacturers tend to over-engineer their products, which, as a result, cost much more than it is necessary. In fact vehicle manufacturers' requirements could be satisfied with substantially less production accuracy and cost associated therewith.

With this in mind, a need exists to develop a method and apparatus for objectively and quantitatively evaluating NVH characteristics of a mechanical system transmitting torque from a drive member and a driven member associated with their manufacturing accuracy in order to determine necessary production accuracy threshold.

SUMMARY OF THE INVENTION

The present invention provides a novel method and apparatus for experimentally evaluating at least one of NVH characteristics of a mechanical system including a torque-transmitting assembly having a drive member and a driven member drivingly engaging said drive member. The torque-transmitting assembly is characterized by a transmission error (TE) between the drive and driven members. The torque-transmitting assembly is further characterized by a mounting distance defined as a distance between datums of the drive and driven members so that the mounting distance defines the transmission error. Determination of functional connection of the TE and the mounting distance is obtained through gear analytical software systems.

The apparatus of the present invention comprises a supporting member mounted to a casing for rotatably supporting the drive member and being axially movable relative to the casing so as to selectively adjust the transmission error, and an actuator assembly operatively associated with the supporting member for selectively adjusting position of the supporting member relative to the casing in order to selectively control the transmission error.

The method according to first aspect of the present invention comprises the following steps. First, the mounting distance of the torque-transmitting assembly is set up to a first value. Then, the mechanical system is operated upon a predetermined test cycle with the mounting distance adjusted to the first value. Subsequently, a parameter representing NVH characteristics of the mechanical system is measured during the operation thereof upon the predetermined test cycle so as to obtain the parameter corresponding to the first value of the mounting distance. Next, the mounting distance of the torque-transmitting assembly is set up to a second value. The mechanical system is then operated upon the predetermined test cycle with the mounting distance adjusted to the second value, and the parameter is measured during the operation thereof upon the predetermined test cycle so as to obtain the parameter corresponding to the second value of the mounting distance.

The method according to second aspect of the present invention comprises the following steps. First, the transmission error of the torque-transmitting assembly is set up to a first value. Subsequently, a parameter representing NVH characteristics of the mechanical system is measured during the operation thereof upon the predetermined test cycle so as to obtain the parameter corresponding to the first value of the transmission error. Next, the transmission error of the torque-transmitting assembly is set up to a second value. The mechanical system is then operated upon the predetermined test cycle with the transmission error adjusted to the second value, and the parameter is measured during the operation thereof upon the predetermined test cycle so as to obtain the parameter corresponding to the second value of the transmission error.

The method and apparatus for evaluating NVH characteristics of a mechanical system according to the present invention is simple and cost effective, and allow obtaining objective quantitative requirements for accuracy of production of torque-transmitting components while avoiding over-engineering of the torque-transmitting components to obtain unnecessarily high accuracy requirements.

BRIEF DESCRIPTION OF THE DRAWINGS

Other objects and advantages of the present invention will become apparent from a study of the following specification when viewed in light of the accompanying drawings, wherein.

DETAILED DESCRIPTION OF PREFERRED EMBODIMENTS

Figure 1:
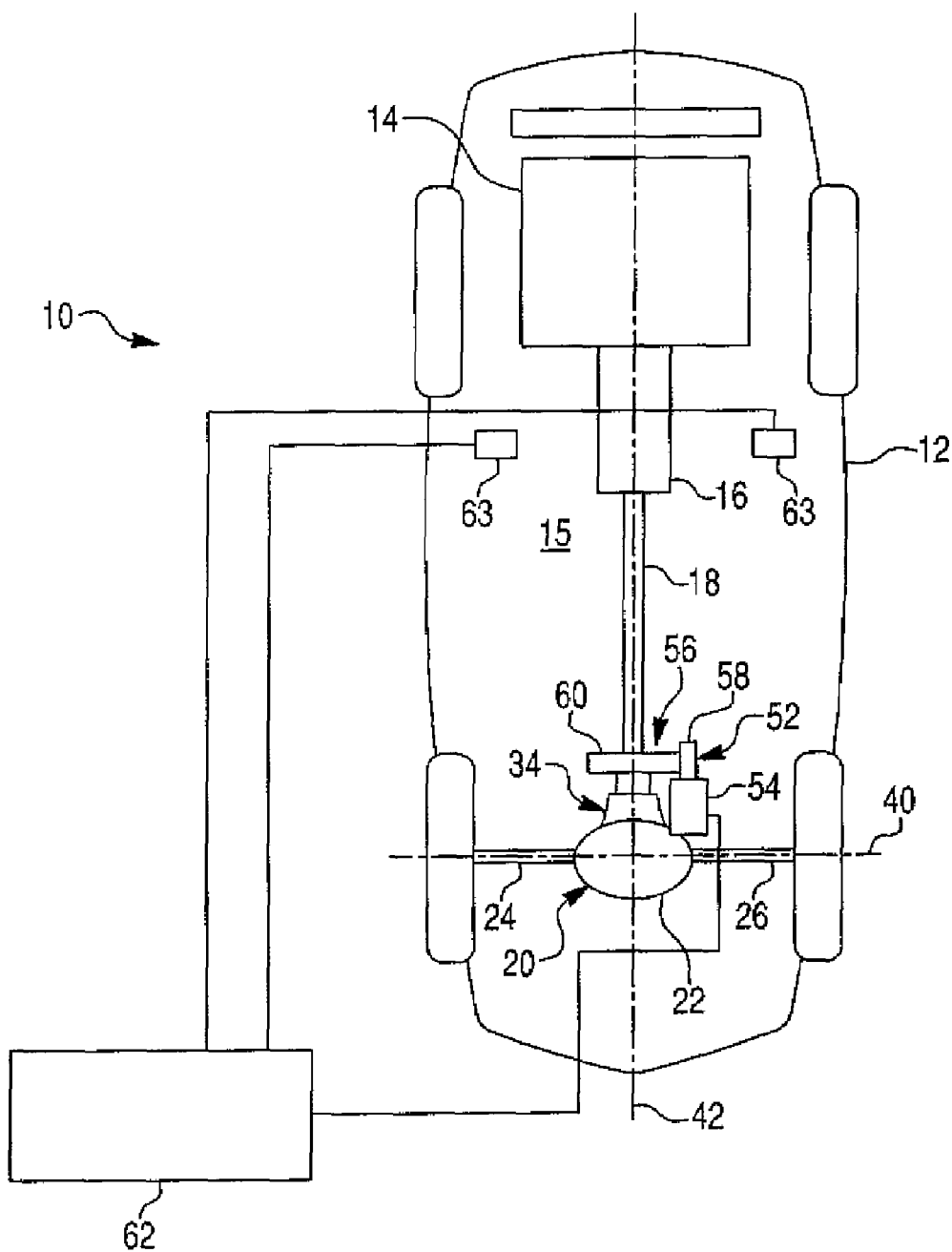
FIG. 1 is a schematic view of a test vehicle in accordance with a preferred embodiment of the present invention.

The preferred embodiment of the present invention will now be described with the reference to accompanying drawings.

For purposes of the following description, certain terminology is used in the following description for convenience only and is not limiting. The words "right," "left," "down" and "up" designate directions in the drawings to which reference is made. The words "downwardly" and "upwardly" refer to position in a vertical direction relative to a geometric center of the apparatus of the present invention and designated parts thereof. The terminology includes the words above specifically mentioned, derivatives thereof and words of similar import. Additionally, the word "a," as used in the claims, means "at least one."

FIG. 1 of the drawings illustrates an exemplary vehicle tested in accordance with the teachings of the present invention generally depicted by reference numeral 10. The vehicle 10 is illustrated to include a vehicle body 12, a prime mover 14, a transmission 16, a propeller shaft 18 and a test drive axle assembly 20. The prime mover 14, such as an internal combustion engine or an electric motor, and the transmission 16 are conventionally provided for supplying a rotary input torque to the test axle assembly 20 through the propeller shaft 18. As these components are well known to those skilled in the art, a detailed discussion of their construction and operation does not need to be provided herein. Although the present invention is described in relation to the input shaft assembly of the drive axle assembly, it is to be understood that the present invention is equally suitable for use in any appropriate mechanical torque-transmitting assembly such as constant velocity (CV) joints, universal joints, and other mechanical torque-transmitting assemblies of an automotive driveline or any other mechanical torque-transmitting system.

Figure 2:
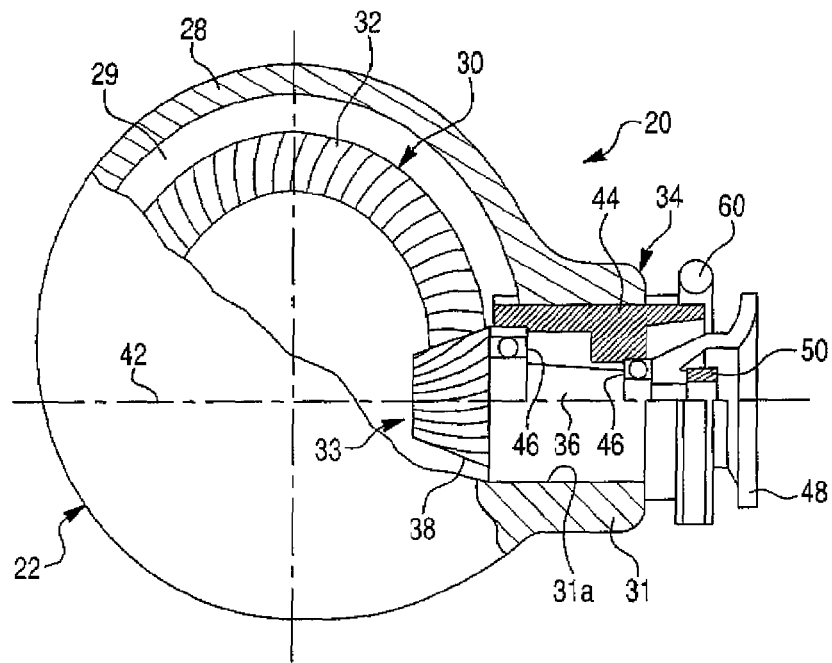
FIG. 2 is a sectional view of a pinion shaft assembly and a ring gear of a test axle assembly in accordance with the preferred embodiment of the present invention.

As illustrated in FIGS. 1 and 2, the axle assembly 20 includes a differential assembly 22, a left axle shaft 24, and a right axle shaft 26. The differential assembly 22 comprises a casing 28, a differential unit 30 provided with a ring gear 32, and a controllable (adjustable) input (or pinion) shaft assembly 34. The casing 28 is typically formed in a suitable casting process and is thereafter machined as required. The casing 28 defines a central cavity 29 housing the differential unit 30. The input shaft assembly 34 includes an input pinion shaft 36 having a drive pinion gear (a drive member) 38 arranged in mesh with the ring gear (a driven member) 32. The drive pinion gear 38 and the ring gear 32 define one of mechanical torque-transmitting assemblies of the automotive driveline in the form of a gear set 33 which defines a final drive of the motor vehicle driveline. Preferably, the ring gear 32 and the drive pinion gear 38 of the gear set 33 are hypoid gears. The drive pinion gear 38 transmits a drive torque from the engine 14 to the ring gear 32 through the transmission 16 and the propeller shaft 18. The casing 28 supports the differential unit 30 for rotation about a first axis 40 (shown in FIGS. 1 and 3), and further supports the input shaft 36 for rotation about a second axis 42 (shown in FIGS. 1 and 2) that is generally perpendicular to the first axis 40. It will be appreciated that the left and right axle shafts 24, 26 are supported for rotation about the first axis 40, as illustrated in FIG. 1.

As further illustrated in detail in FIG. 2, the input shaft assembly 34 according to the preferred embodiment of the present invention comprises a supporting member in the form of a supporting cylinder 44 threadedly mounted in a bore 31a in a neck portion 31 of the differential casing 28. Thus, rotation of the supporting cylinder 44 causes axial movement of the supporting cylinder 44 along the second axis 42. In other words, the supporting member 44 is selectively axially movable along the second axis 42 in the directions to and away from the ring gear 32. The input shaft 36 is supported by the supporting cylinder 44 for rotation about the second axis 42 through a pair of axially spaced antifriction bearings 46.

The input shaft 36 is further provided with a pinion flange 48 secured at a distal end of the input shaft 36 by a nut 50. Moreover, the nut 50 secures the input shaft 36 to the supporting cylinder 44 in axial direction so that the input shaft 36 (and the drive pinion gear 38) is not movable relative to the supporting cylinder 44 in the direction of the second axis 42. At the same time, the input shaft 36 is axially movable with the supporting cylinder 44 along the second axis 42. Thus, the support cylinder 36 provides axial adjustability of the input shaft 36, thus the drive pinion gear 38, relative the ring gear 32 along the second axis 42.

Figure 3:
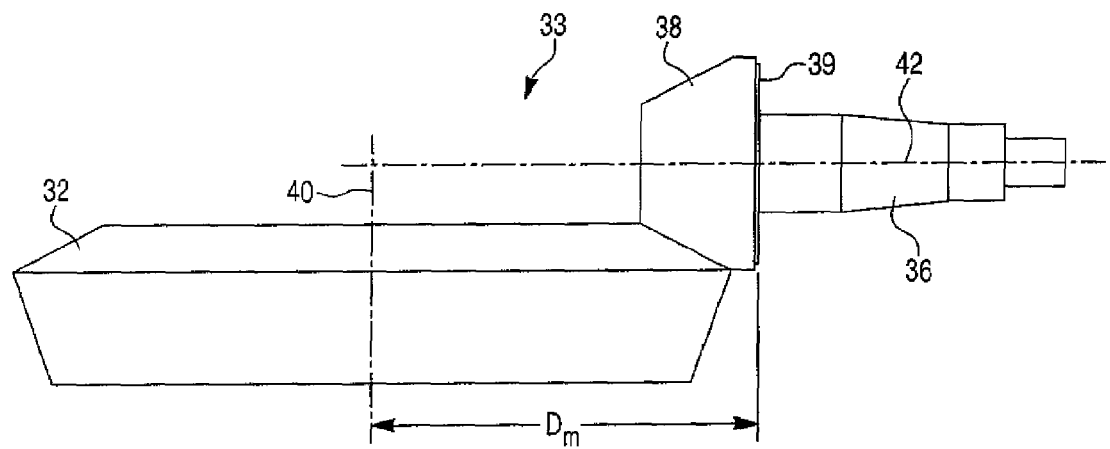
FIG. 3 is a sectional view of a gear set in accordance with the preferred embodiment of the present invention.

The gear set 33, as virtually any mechanical torque-transmitting assembly, is characterized by a mounting distance $D_M$ thereof. In turn, the mounting distance $D_M$ of the gear set 33 is defined as a distance between datums of the drive pinion gear (drive member) 38 and the ring gear (driven member) 32. It will be appreciated that the term "datum" is defined in the mechanical art as a reference (point, line or plane) from which measurements are made; a manufacturing location point. According to the preferred embodiment of the present invention, a datum of the ring gear 32 is in the form of the first axis 40, while a datum of the drive pinion gear 38 is in the form of a back (thrust) surface 39 thereof. Therefore, the mounting distance $D_M$ of the gear set 33 is defined as a distance between the first axis 40 of said ring gear 32 and the back (thrust) surface 39 of the pinion gear 38, as illustrated in FIG. 3.

The vehicle 10 of the present invention further comprises an actuator assembly 52 provided for selectively adjusting position of the supporting member 44 relative to the casing 28, thus the position of the drive pinion gear 38 relative to the and the ring gear 32.

The actuator assembly 52 includes a servo-electric drive motor 54 and an actuator gearing 56 operatively associated with the supporting cylinder 44. According to the preferred embodiment of the present invention, the actuator gearing 56 includes a worm gear 58 driven by the servo-electric drive motor 54, and a worm wheel 60 in mesh with the worm gear 58. The worm wheel 60 is non-rotatably fixed to the supporting cylinder 44 so that rotational movement of the worm wheel 60 is translated into the rotational movement of the supporting cylinder 44. In turn, the rotation of the supporting cylinder 44 causes the axial displacement of the drive pinion gear 38 relative to the ring gear 32 into or out of the casing 28 depending on the direction of the rotation of the worm gear 58 so as to selectively adjust the mounting distance of the gear set 33.

Preferably, the servo-electric drive motor 54 is a reversible electric motor. The servo-electric drive motor 54 is controlled by an electronic control unit (ECU) 62, which is preferably installed inside of a passenger compartment 15 of the vehicle body 12. It will be appreciated that when the electric motor 54 drives the worm gear 58, the drive pinion gear 38 is axially displaced relative to the ring gear 32 in the direction to or from thereof depending on the direction of the rotation of the electric motor 54. Therefore, by actuating the electric motor 54 a vehicle operator (driver) has ability to drive the drive pinion gear 38 in one or another direction, and this way selectively and infinitely adjust the mounting distance $D_M$ of the hypoid gear set 33.

Figure 4:
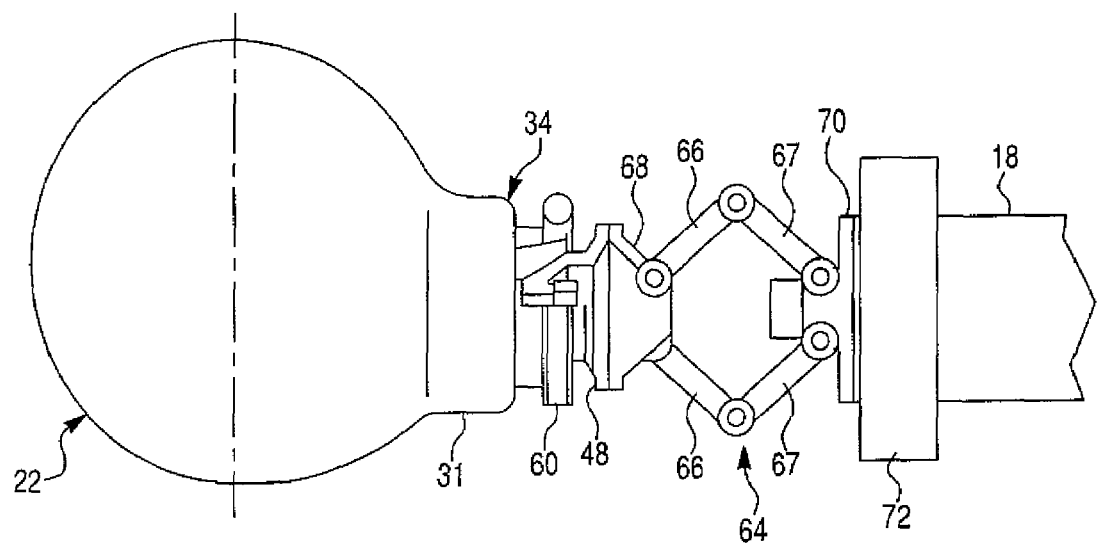
FIG. 4 depicts a lever mechanism coupling a propeller shaft to an input pinion shaft.

Displacement of the supporting cylinder 44, thus the input shaft 36, changes position of the pinion flange 48. In turn, this may change position of the propeller shaft 18, and thus induce distortion into NVH measuring process. It could happen due to alteration of inclination angle of the propeller shaft 18. In order to prevent changing of the position of the propeller shaft 18, the vehicle 10 according to the preferred embodiment of the present invention comprises a lever mechanism 64 illustrated in detail in FIG. 4. Preferably, the lever mechanism 64 includes pivotally connected (or hinged) levers 66 and 67 that attached to flange 10. The levers 66 are connected to the pinion flange 48 through a first mounting flange 68, while the levers 67 are connected to a distal end 72 of the propeller shaft 18 through a second mounting flange 70. Thus, the lever mechanism 64 transmits drive torque from the propeller shaft 18 to the input pinion shaft 36, and, at the same time, prevents changing of the position of the propeller shaft 18. In other words, displacement of the pinion flange 48 will not affect position of the propeller shaft 18 that is fastened to the transmission 16 of the motor vehicle 10.

It will be appreciated that the mounting distance $D_M$ of the mechanical torque-transmitting assembly defines a gear transmission error (TE) thereof as there is exist a certain functional dependence between of the mounting distance $D_M$ and TE of the gear set 33 that could be determined by application of modern gear design systems. In other words, TE of the gear set 33 is a function of the mounting distance $D_M$ thereof. Hence, by selectively adjusting (controlling) the mounting distance $D_M$ of the hypoid gear set 33, the hypoid gear set 33 can be calibrated in terms of TE. Thus, since $D_M$ could be calibrated as values of transmission errors (TE), commands of the ECU 62 will affect TE of the gear set 33. This way, the vehicle operator can control and manipulate (adjust) TE of the gear set 33 to any desirable value remotely from the passenger compartment 15 of the vehicle 10 by application of the actuator assembly 52. Alteration (adjustment) of TE allows changing configuration of the gear set 33 without removing the axle assembly 20 from the vehicle 10 and exchanging it with another gear set with different TE. Exchange of the driveline components, such as the hypoid gear set, does not guarantee correct results since reinstallation of the driveline component would inevitably change transitional function of noise propagation in the vehicle and therefore would affect the accuracy of noise measurement.

If the controllable reconfiguration of mounting distance $D_M$ would be implemented in test axle assembly 20, where $D_M$ could be easily controlled, then, based on analytical software, this controllability may be calibrated in terms of induced TE value. It will be appreciated that transmission error (TE) is defined in the mechanical art as a deviation of position of a driven member relative to its drive member ideal kinematic position. It is usually defined as a linear positional error along the line of action of the driven member.

As the vehicle body 12 is connected to the axle assembly 20, noise and vibration generated by the gear set 33 during the operation of the vehicle 10 are transmitted into the passenger compartment 15 of the vehicle 10 where it would be felt or heard by the vehicle passengers. It is known in the art that noise, vibration and harshness (NVH) characteristics of the gear set 33 and the motor vehicle 10 as a whole depend on the TE value thereof, which, in turn, is defined by the mounting distance $D_M$ of the gear set 33. Thus, using the controllable input shaft assembly 34 according to the present invention, determination NVH characteristics of the motor vehicle 10 can be achieved in quantified association with TE in the gear set 33 of automotive axle assembly 20 through a reliable and repeatable measurement methodology.

For this reason, the vehicle 10 further includes one or more appropriate sensors for monitoring at least one parameter representing NVH characteristics of the vehicle 10. Preferably, the vehicle 10 is provided with two or more acoustic sensors 63, such as microphones, for monitoring a noise level in the passenger compartment 15. The microphones 63 are electrically connected to the ECU 62 which determines a spectral density of the noise in the passenger compartment 15. Preferably, one of the microphones 63 is mounted on a driver side of the passenger compartment 15, while the other microphone 63 is mounted on a passenger side thereof. Alternatively, the sensors 63 could be vibration sensors, such as accelerometers mounted to the vehicle 10 inside or outside the passenger compartment 15.

The human operator that located in the passenger compartment 15 of the vehicle 10 can control configuration of test axle assembly 20 using the actuator assembly 52 that changes $D_M$ to set up a required TE in the vehicle 10. Simultaneously with this, he could conduct the whole experiment by recording signals from the microphones 63 placed in various points of the passenger compartment 15 in order to research acoustical distribution as a space field. Thus could be obtained acoustical matrix in coordinates of TE and various vehicle speeds. Several matrixes related to different locations of the microphones 63 in the passenger compartment 15 would give full description of acoustical field that is vehicle NVH characteristic for the given axle assembly 20.

The following measuring procedure is easily implemented in practical use. First, the test axle assembly 20 is mounted on the tested vehicle 10 once and used for all experiments without remounting. Then, the test operator sets up (adjusts) the mounting distance $D_M$ of the gear set 33 to a first value $D_{M1}$, thus setting a first value of graduated transmission error $TE_1$. After that, the vehicle 10 is subjected to a first test run so as to be operated at various speed and driving conditions upon a predetermined test driving cycle while the ECU 62 monitors (measures) and records signals from the microphones 63 and determines a first spectral density of the noise in the passenger compartment 15 corresponding to $TE_1$ and the mounting distance $D_{M1}$. The test cycle allows obtaining NVH spectrum at different vehicle speeds and engine RPMs in a full range of operating speed of the motor vehicle. The mounting distance $D_M$ (thus transmission error) is constant throughout the first test run and equal to the first distance value $D_{M1}$.

Next, the test operator sets up (adjusts) the mounting distance $D_M$ of the gear set 33 to a second distance value $D_{M2}$ different from the first distance value $D_{M1}$, thus setting a second value of graduated transmission error $TE_2$ different from $TE_1$. Then, the vehicle 10 is subjected to a second test run so as to be operated at various speed and driving conditions upon the predetermined driving cycle (substantially similar to the predetermined driving cycle of the first test run) while the ECU 62 monitors and records signals from the microphones 63 and determines a second spectral density of the noise in the passenger compartment 15 corresponding to $TE_2$ and the mounting distance $D_{M2}$. Again, the mounting distance $D_{M2}$ is constant throughout the second test run.

It will be appreciated that the test operator may set up (adjust) the mounting distance $D_M$ of the gear set 33 to any number of discrete distance values $D_{MN}$ and, consequently, graduated transmission errors $TE_N$. At each of the discrete distance values $D_{MN}$ (and $TE_N$) of the gear set 33 the vehicle 10 is subjected to a separate test run so as to be operated at various speed and driving conditions upon the predetermined driving cycle (substantially similar to the predetermined driving cycles of the first and second test run) while the ECU 62 monitors and records signals from the microphones 63 and determines the spectral density of the noise in the passenger compartment 15 corresponding to each of the $TE_N$ and the mounting distance $D_M$ set to one of the discrete distance values $D_{MN}$. The mounting distance $D_{MN}$ (thus $TE_N$) remains constant throughout each of the test run. In other words, the test operator registers the level of noise in the passenger compartment 15 for each of the discrete distance values $D_{MN}$, i.e. for each value of the graduated TE. Therefore, by changing configuration of the mechanical torque-transmitting assembly (e.g. the gear set 33) of the vehicle 10, the test operator changes TE thereof and, consequently, one or more of the NVH characteristics (such as the noise level of in the passenger compartment 15) of the vehicle 10.

After the results of two or more test runs are obtained, one or more of the NVH characteristics of the vehicle 10 (such as the noise level of in the passenger compartment 15 generated by the axle assembly 20 at various mounting distance values $D_{MN}$ and TE) are compared to each other so as to evaluate the NVH characteristics of the vehicle 10 and to determine the sensitivity of the NVH characteristics of the test vehicle 10 to the TE of the drive axle assembly 20.

It will be appreciated that the motor vehicle may be subjected to any appropriate number of similar test runs so as to determine a corresponding number of spectral densities of the noise (or any other parameter representing NVH characteristics of the motor vehicle) in the passenger compartment 15 corresponding to various different values of TE and the mounting distances $D_M$. Repeating the same test cycle for various TE values would allow building a waterfall NVH diagram that completely characterizes the NVH characteristics of the vehicle with a given type of driveline torque-transmitting component (mechanism).

Therefore, the method and apparatus of the present invention allow to evaluate NVH characteristics of the vehicle at various discrete TE calibrations and to determine optimal requirement to TE value of the final drive of the motor vehicle, i.e. TE value which provides desired NVH level in the particular motor vehicle in a most cost effective manner. In that case it would not be necessary to over-engineer axles in order to reach NVH goals. The above determined optimal TE value is then used to set TE value of a serially produced drive axle assemblies for the particular motor vehicle on which the above test was performed. Similar approach could be applied to other driveline components of the motor vehicle, such as constant velocity (CV) joints, universal joints, etc. By changing configuration of the driveline component with a specially calibrated mechanism, it would be possible to compare NVH characteristics of the vehicle versus a known calibrated mechanism error.

The method and apparatus for evaluating NVH characteristics of a mechanical system, such as a motor vehicle, according to the present invention presents a number of benefits to engineers. More specifically, the present invention is simple and cost effective, and the variations of TE possess absolutely natural character, exactly the same way as it occurs in practice. Therefore, there is no need in synthesis of special signals, to search special signal spectrums, etc. Moreover, a vehicle operator can control TE of a torque-transmitting component of an automotive driveline to any desirable value remotely from a passenger compartment of a vehicle by application of an actuator assembly. Alteration (adjustment) of TE allows changing configuration of the torque-transmitting component without removing from the vehicle and exchanging it with another torque-transmitting component with different TE.

Further benefits of the practical implementation of the present invention in a design process of a mechanical system are based on acquisition of objective quantitative requirements for accuracy of production of a driveline component. It allows avoiding over-engineering of driveline components and hence to get essential economy on product manufacturing investments to obtain unnecessarily high accuracy requirements.

The present invention is applicable a number of torque-transmitting components since the main principle of the present invention is the application of the same torque-transmitting component for inducing a known alteration of technological parameter and fixation of the NVH characteristics that caused by this component.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. An apparatus for evaluating at least one NVH characteristic of a mechanical system including a torque-transmitting assembly having a drive member and a driven member drivingly engaging said drive member; said torque-transmitting assembly being characterized by a transmission error between said drive and driven members; said apparatus comprising:
   a supporting member mounted to a casing for rotatably supporting said drive member and being axially movable relative to said casing so as to selectively adjust said transmission error; and
   an actuator assembly operatively associated with said supporting member for selectively adjusting position of said supporting member relative to said casing in order to selectively control said transmission error.

2. The apparatus as defined in claim 1, wherein said torque-transmitting assembly is further characterized by a mounting distance defined as a distance between datums of said drive and driven members; and wherein said mounting distance defines said transmission error.

3. The apparatus as defined in claim 2, wherein said torque-transmitting assembly is a gear set including said drive and driven members in the form of toothed gears in mesh with each other.

4. The apparatus as defined in claim 2, wherein said mechanical system is a motor vehicle, and wherein said torque-transmitting assembly is a torque-transmitting component of a driveline of said motor vehicle.

5. The apparatus as defined in claim 4, wherein said torque-transmitting component is a final drive gear set of a motor vehicle axle assembly;

wherein said drive member is a pinion gear and said driven member is a ring gear in mesh with said pinion gear; and wherein said mounting distance is defined as a distance between a rotational axis of said ring gear and a back surface of said pinion gear of said gear set.

6. The apparatus as defined in claim 5, wherein said supporting member is a supporting cylinder threadedly mounted in a cylindrical bore in said casing so that a rotational movement of said supporting cylinder causes axial movement of pinion gear relative to said ring gear for controlling said mounting distance.

7. The apparatus as defined in claim 6, wherein said actuator assembly includes a motor and an actuator gearing operatively associated with said supporting cylinder.

8. The apparatus as defined in claim 7, wherein said actuator gearing includes a worm gear driven by said motor and a worm wheel in mesh with said worm gear; said worm wheel is non-rotatably fixed to said supporting cylinder so that rotational movement of said worm wheel is translated into the rotational movement of said supporting cylinder.

9. The apparatus as defined in claim 7, wherein said motor is a reversible electric motor.

10. The apparatus as defined in claim 7, further comprising an electronic control unit provided for controlling said motor in order to selectively control said mounting distance.

11. The apparatus as defined in claim 10, further comprising at least one sensor for monitoring at least one parameter representing NVH characteristics of said vehicle.

12. The apparatus as defined in claim 11, wherein said at least one sensor is an acoustic sensor electrically connected to said electronic control unit to determine a level of noise in a passenger compartment of said vehicle generated by said gear set.

13. The apparatus as defined in claim 12, wherein said acoustic sensor is a microphone.

14. The apparatus as defined in claim 11, wherein said at least one sensor is a vibration sensor electrically connected to said electronic control unit to determine vibration of said vehicle generated by said gear set.

15. The apparatus as defined in claim 2, wherein said actuator assembly includes a motor and an actuator gearing operatively associated with said supporting member.

16. The apparatus as defined in claim 15, further comprising an electronic control unit provided for controlling said motor in order to selectively control said mounting distance.

17. The apparatus as defined in claim 16, further comprising at least one sensor for monitoring at least one parameter representing NVH characteristics of said mechanical system.

18. The apparatus as defined in claim 17, wherein said at least one sensor is an acoustic sensor provided to determine a level of noise of said mechanical system generated by said torque-transmitting assembly.

19. The apparatus as defined in claim 17, wherein said at least one sensor is a vibration sensor provided to determine vibration of said mechanical system generated by said torque-transmitting assembly.

20. A method for evaluating NVH characteristics of a mechanical system including a torque-transmitting assembly having a drive member and a driven member drivingly engaging said drive member; said torque-transmitting assembly being characterized by a mounting distance defined as a distance between datums of said drive and driven members; said method comprising the steps of:

setting up said mounting distance of said torque-transmitting assembly to a first value;

operating said mechanical system upon a predetermined test cycle with said mounting distance adjusted to said first value;

measuring at least one parameter representing NVH characteristics of said mechanical system during the operation thereof upon said predetermined test cycle so as to obtain a value of said at least one parameter corresponding to said first value of said mounting distance;

setting up said mounting distance of said torque-transmitting assembly to a second value;

operating said mechanical system upon said predetermined test cycle with said mounting distance adjusted to said second value; and measuring said at least one parameter during the operation thereof upon said predetermined test cycle so as to obtain a value of said at least one parameter corresponding to said second value of said mounting distance.

21. The method as defined in claim 20, further comprising the step of comparing said value of said at least one parameter corresponding to said first value of said mounting distance to said value of said at least one parameter corresponding to said second value of said mounting distance.

22. The method as defined in claim 21, wherein said at least one parameter is a noise level generated by said torque-transmitting assembly.

23. The method as defined in claim 21, wherein s said at least one parameter is vibration generated by said torque-transmitting assembly.

24. The method as defined in claim 20, wherein said mechanical system is a motor vehicle, and wherein said torque-transmitting assembly is a torque-transmitting component of a driveline of said motor vehicle.

25. The method as defined in claim 24, wherein said torque-transmitting component is a final drive gear set of a motor vehicle axle assembly.

26. The method as defined in claim 25, wherein said drive member is a pinion gear and said driven member is a ring gear in mesh with said pinion gear.

27. The method as defined in claim 26, wherein said mounting distance is defined as a distance between a rotational axis of said ring gear and a back surface of said pinion gear of said gear set.

28. The method as defined in claim 24, wherein said vehicle further comprises at least one sensor for monitoring said at least one parameter representing NVH characteristics of said vehicle.

29. The method as defined in claim 28, wherein said at least one sensor is an acoustic sensor provided to determine a level of noise in a passenger compartment of said vehicle generated by said gear set.

30. The method as defined in claim 28, wherein said at least one sensor is a vibration sensor provided to determine a level of vibration of said vehicle generated by said final drive gear set.

31. A method for evaluating NVH characteristics of a mechanical system including a torque-transmitting assembly having a drive member and a driven member drivingly engaging said drive member; said torque-transmitting assembly being characterized by a transmission error between said drive and driven members; said method comprising the steps of:

setting up said transmission error of said torque-transmitting assembly to a first value;

operating said mechanical system upon a predetermined test cycle with said transmission error adjusted to said first value;

measuring at least one of said NVH characteristics of said mechanical system during the operation thereof upon said predetermined test cycle so as to obtain a value of said least one of said NVH characteristics corresponding to said first value of said transmission error;

setting up said transmission error of said torque-transmitting assembly to a second value;

operating said mechanical system upon said predetermined test cycle with said transmission error adjusted to said second value; and measuring said at least one of said NVH characteristics of said mechanical system during the operation thereof upon said predetermined test cycle so as to obtain a value of said least one of said NVH characteristics corresponding to said second value of said transmission error.

32. The method as defined in claim 31, further comprising the step of comparing said value of said at least one of said NVH characteristics corresponding to said first value of said mounting distance to said value of said at least one of said NVH characteristics corresponding to said second value of said mounting distance.

33. The method as defined in claim 31, wherein said transmission error is defined by a mounting distance of said torque-transmitting assembly characterized as a distance between datums of said drive and driven members.

* * * * *